United States Patent [19]

Odhner et al.

[11] Patent Number: 5,613,022
[45] Date of Patent: Mar. 18, 1997

[54] DIFFRACTIVE DISPLAY AND METHOD UTILIZING REFLECTIVE OR TRANSMISSIVE LIGHT YIELDING SINGLE PIXEL FULL COLOR CAPABILITY

[75] Inventors: Jefferson E. Odhner, Orlando, Fla.; Daniel J. Smith, Stow, Ohio; Shailesh S. Bhat, Troy, Mich.; Donald L. Cullen, Columbus, Ohio; Ken G. Wasson, Foster City, Calif.

[73] Assignee: Luckoff Display Corporation, Columbus, Ohio

[21] Appl. No.: 295,900

[22] PCT Filed: Jul. 12, 1994

[86] PCT No.: PCT/US94/07584

§ 371 Date: Mar. 13, 1995

§ 102(e) Date: Mar. 13, 1995

[87] PCT Pub. No.: WO95/02838

PCT Pub. Date: Jan. 26, 1995

Related U.S. Application Data

[63] Continuation-in-part of Ser. No. 93,255, Jul. 16, 1993, abandoned.

[51] Int. Cl.[6] .............................. G02B 6/34; G03H 1/00
[52] U.S. Cl. .................................. 385/37; 385/14; 385/20; 385/147; 385/901; 359/1; 359/15; 359/32; 359/566; 359/569
[58] Field of Search .................................. 385/20, 15, 16, 385/37, 25, 147, 901, 14; 359/558, 566, 567, 569, 576, 1, 10, 11, 15, 22, 32, 34

[56] References Cited

U.S. PATENT DOCUMENTS 4,234,245  11/1980  Toda et al. .............................. 350/269
4,274,101  6/1981   Kataoka et al. ........................ 346/108
4,331,972  5/1982   Raichman ................................ 358/60
4,415,228  11/1983  Stanley ................................ 385/15 X
5,052,777  10/1991  Ninnis et al. ........................... 385/19
5,067,829  11/1991  Jaskie et al. ............................ 385/8
5,126,836  6/1992   Um ...................................... 358/60
5,151,724  9/1992   Kikinis ............................... 359/32 X

OTHER PUBLICATIONS

Gale, et al, "Diffractive Diffusers for Display Application" Current Developments in Optical Engineering and Diffraction Phenomena, SPIE VH.679, 165–168 (1986).

Toda, et al., "Large Area Display Element Using $PVF_2$ Bimorph with Double-Support Structure" Ferroelectrics, 1980, vol. 23, pp. 115–120.

Toda, et al., "Large Area Electronically Controllable Light Shutter Array Using $PVF_2$ Bimorph Vanes"; Ferroelectrics, 1980, vol. 23, pp. 121–124.

Linville $PVF_2$ Models, Measurements And Devices Ferroelectrics, 1989 vol. 28, pp. 291–296.

Primary Examiner—Brian Healy
Attorney, Agent, or Firm—Mueller and Smith, LPA

[57] ABSTRACT

The present invention is directed to a diffractive display suitable for presenting graphic and the like displays. Broadly, the novel display is realized from a diffraction pattern (132) carried by (e.g. embossed) a film or element (138) connected to an energy source which is energizable for movement of the film (138). Movement of the patterned film (138) generates a display using the diffracted light from the embossed pattern (132). Electroactive films are known in the art, including, for example, piezoelectric films, electrostrictive films, electromotive films, and electrostatic films. Magnetoactive films also are known in the art. Any of these films (138) can carry the diffraction pattern (132) and be energized for movement to generate from the resulting diffracted light.

75 Claims, 9 Drawing Sheets

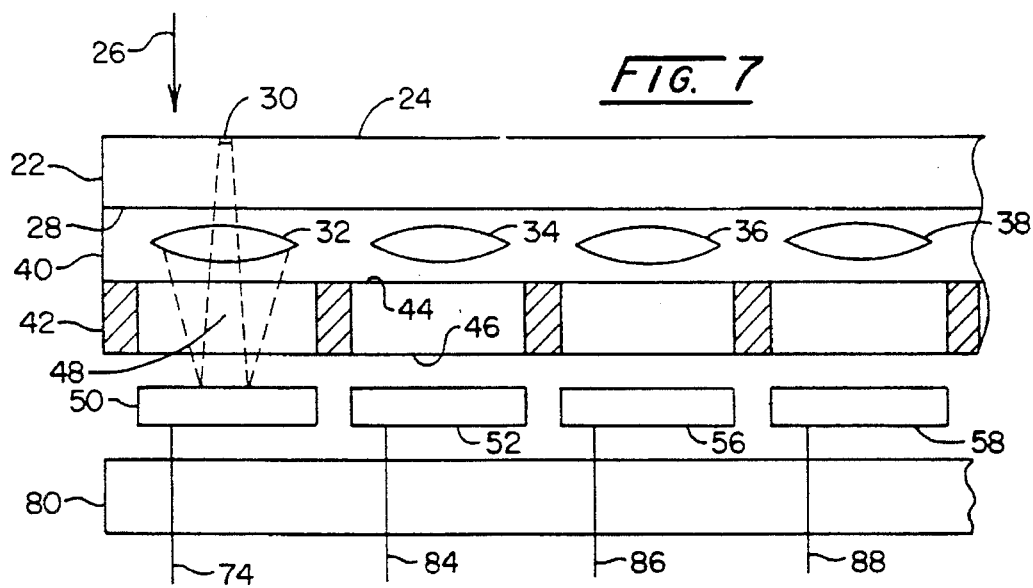
FIG. 7
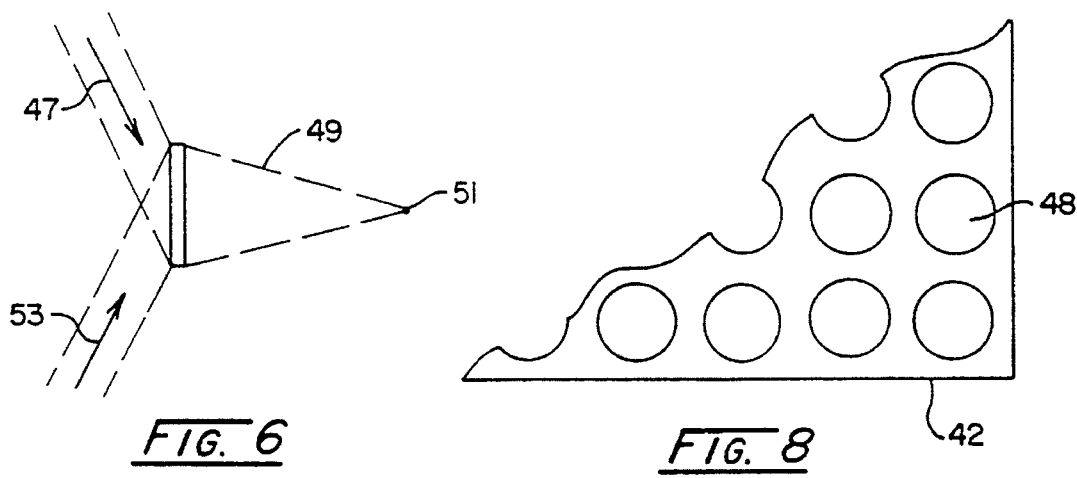
FIG. 6
FIG. 8
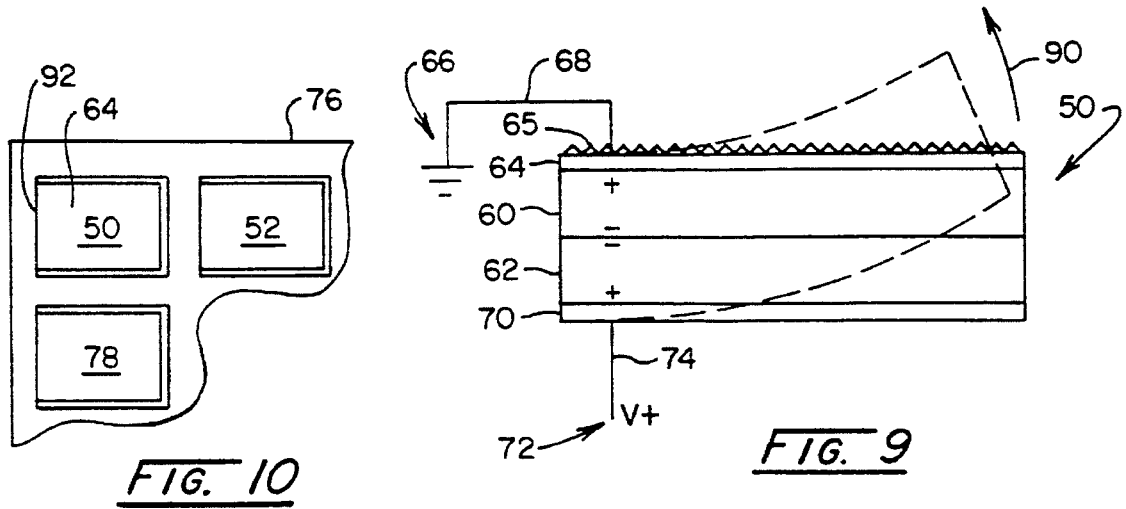
FIG. 10
FIG. 9

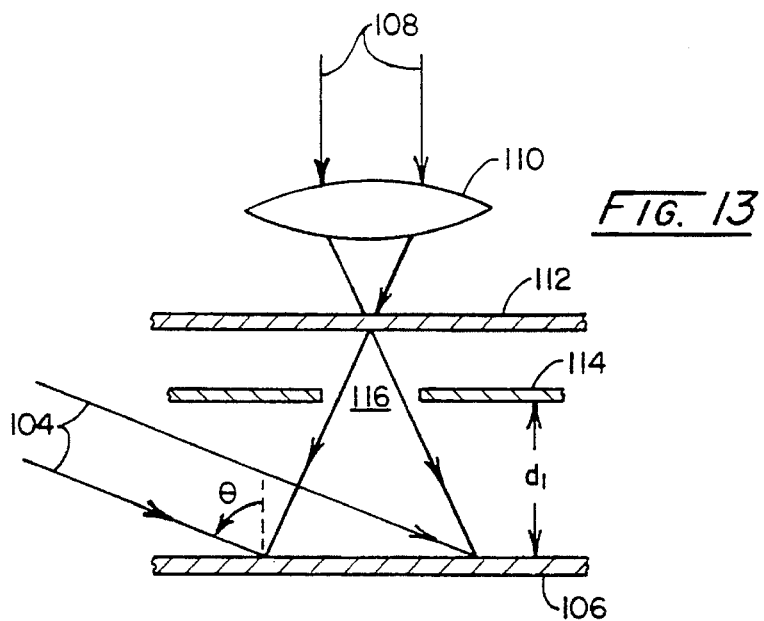
FIG. 13
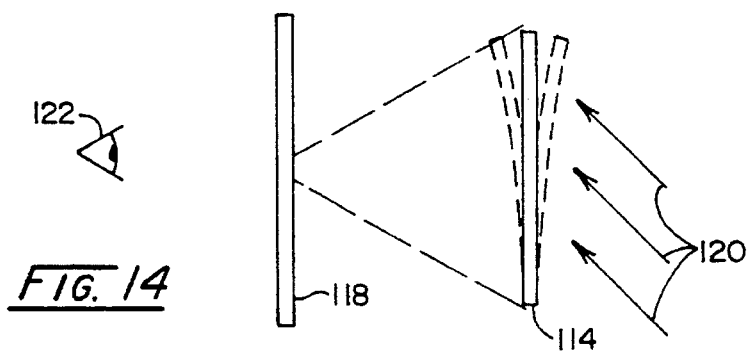
FIG. 14
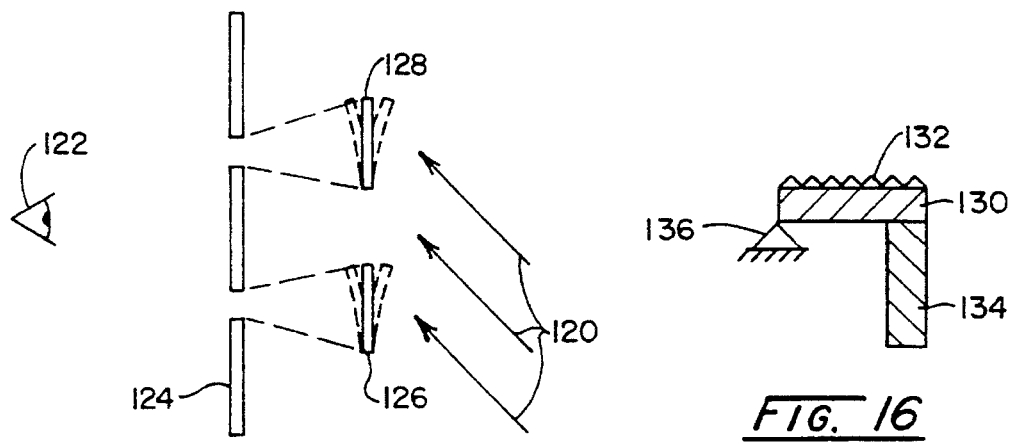
FIG. 15
FIG. 16

DIFFRACTIVE DISPLAY AND METHOD UTILIZING REFLECTIVE OR TRANSMISSIVE LIGHT YIELDING SINGLE PIXEL FULL COLOR CAPABILITY

CROSS-REFERENCE TO RELATED APPLICATIONS

This application is a 371 of PCT/U.S. 94/07584, filed Jul. 12, 1994, and a continuation-in-part of application Ser. No. 08/093,255, filed Jul. 16, 1993, now abandoned, the disclosure of which is expressly incorporated herein by reference.

BACKGROUND OF THE INVENTION

The present invention relates to displays and more particularly to a diffractive display (reflective or transmissive) wherein each pixel exhibits a full range of diffracted wavelengths (e.g., full range of colors) by a novel diffractive technique.

The art is replete in proposing graphics displays which utilize, for example, bimorph elements or, simply, bimorphs, or equivalents. A bimorph is a device manufactured with two strips of piezoelectric film which are fastened together and which have electrodes allowing electrical fields of the proper polarity to be applied to the film to cause an electrostrictive effect to occur. Such electrostrictive effect can be an in-plane elongation or contraction, or an out-of-plane deflection of one end of the film when the opposite end is secured.

U.S. Pat. No. 4,331,972 proposes a light valve comprising a pair of elements of transparent material, each comprising a diffraction grating of light periodicity facing each other with parallel grating lines. Such light valve is termed a bigrate in this patent. The transmission of light through the bigrate will depend on the relative position of the pair of gratings in the direction perpendicular to the grating lines. One of the gratings may be embossed on a bimorph film of polyvinylidene fluoride and moved by the application of a voltage thereto. One strip, then, may be moved relative to the other in response to an electrical signal to control the zero diffraction or the light transmission from no transmission to full transmission, or any desired intermediate transmission. Three different superimposed bigrated light valves are used for achieving the three different colors required for a color display, viz., cyan, magenta, and yellow.

U.S. Pat. No. 5,067,829 proposes to steer light beams by passing the light beams through optically transparent elastic material which are bent under the application of a voltage which bending or deformation causes the change in the angle at which the light beam intercepts the surfaces of the optically transparent layers.

U.S. Pat. No. 5,052,777 utilizes a bimorph as a shutter to pass or block light coupling therethrough. Such bimorph shutters permit light, such as transmitted through optical fibers, to be coupled through the bimorph light valves to an observer for generating graphic displays.

U.S. Pat. No. 4,274,101 discloses a laser recorder that utilizes a piezoelectric bimorph focal length vibrator.

U.S. Pat. No. 5,126,836 proposes a television display wherein a white light source emits a beam onto a plurality of dichroic mirrors which split the beam into three beams of primary colors, then reflects the primary beams onto three deformable reflective surfaces which may be piezoelectric crystals, which again reflect the beams through slits in a non-reflective surface, thereby modulating the intensity of the beams. U.S. Pat. No. 4,415,228 proposes a bimorph light valve also as does U.S. Pat. No. 4,234,245.

Additional proposals include Stein, et al, "A Display Based on Switchable Zero Order Diffraction Grating Light Valves", *Advances in Display Technology V*, SPI vol. 526, 105–112 (1985), which propose a flat panel display which utilizes a matrix of line addressable light valves back-lighted with a partially collimated source. The basic pixel element of the display is an optical switch based on the zero order of diffraction by two aligned transmission phase gratings. The transmission of light is modulated by mechanically displacing one grating with respect to the other by one-half of the grating. A bimorph is used for this purpose.

Finally, another proposal is by Gale, et at., "Diffractive Diffusers for Display Application", *Current Developments in Optical Engineering and Diffraction Phenomena*, SPIE vol. 679, 165–168 (1986), which propose diffractive optical diffusers for display applications wherein the diffusers can be fabricated by laser beam writing techniques.

While the foregoing techniques function to some degree to provide graphic displays, there still exists a real need in the art to make such displays economical and practical, especially when produced in large volume, and to be fully addressable for providing complex graphics displays.

BROAD STATEMENT OF THE INVENTION

The present invention is directed to a diffractive display suitable for presenting graphic and the like displays. Broadly, the novel display is realized from a diffraction pattern carried by a film or element (e.g., an embossed film) connected to an energy source which is energizable for movement of the film. Movement of the patterned film generates a display using the diffracted light from the embossed pattern.

Electroactive films are known in the art, including, for example, piezoelectric films, electrostrictive films, electromotive films, and electrostatic films. Magnetoactive films also are known in the art. Any of these films can carry the diffraction pattern and be energized for movement to generate from the resulting diffracted light.

One desirable film is a piezoelectric film which film is connected to an energy source for its movement. The movement of said embossed film generates a display using the diffracted light from the embossed pattern. Preferably, multiple layers of the piezoelectric films are formed into a bimorph element which bears the diffractive pattern for forming the novel display. Preferably, also, the piezoelectric films used alone or in a bimorph element are elastic, i.e., they return to their original position after movement by the energy source which most probably is an electrical source.

One embodiment of the piezoelectric diffractive display is a transmissive diffractive display. This display includes an outer transparent rigid member having an outer surface and an inner surface, wherein this member restricts reflected energy incident on its inner surface. A discrete lens element has an apparent outer surface and an apparent inner surface and is adjacent to the outer transparent rigid member. A rigid opaque spacer has an outer surface and an inner surface, has an aperture in registration with said discrete lens element, and is disposed in adjacency to the lens element apparent inner surface. A transmissive discrete bimorph element is in registration with the rigid opaque spacer aperture, wherein the discrete bimorph element has an inner surface and an outer energy diffractive surface adjacent to the spacer aperture which diffractive surface bears a diffraction grating for diffracting energy passed therethrough when said bimorph element is in a relaxed state. The discrete bimorph element is connected to a source effective to generate selected excited states therefor wherein said bimorph element is physically displaced from its location in a relaxed state. The bimorph element transmits a different diffraction of the energy passed therethrough when said bimorph element is in an excited state. Thus, energy transmitted through the diffraction grating is diffracted and then passed through said aperture through said lens element which focuses said diffracted energy onto the transparent rigid member outer surface.

Another piezoelectric film embodiment is a reflective diffractive display. This display includes an outer transparent rigid member having an outer surface and an inner surface. This outer member passes incoming energy incident on its outer surface, but restricts reflected energy incident on its outer surface, the underside of which, for example, has been coated. A discrete lens element has an apparent outer surface and an apparent inner surface and is disposed adjacent to the outer transparent rigid member. This lens element focuses energy passed through the outer transparent rigid member and incident thereon from the lens element apparent outer surface onto the outer transparent rigid member with such energy then reflected back through the lens element. A rigid opaque spacer has an outer surface and an inner surface, has an aperture in registration with the discrete lens element, and is disposed in adjacency to the lens element apparent inner surface. A bimorph element is in registration with the rigid opaque spacer aperture. This bimorph element has an outer energy reflecting surface adjacent to the spacer aperture which reflecting surface bears a diffraction grating which permits reflectance of selected diffracted energy incident on the outer bimorph element surface when said bimorph element is in a relaxed state. The bimorph element is connected to a source effective to generate selected excited states therefor wherein said bimorph element is physically displaced from its location in a relaxed state. The bimorph element permits reflectance of different diffracted energy incident on the bimorph element outer surface when the bimorph element is in an excited state. Thus, energy incident on the transparent rigid member outer surface passes therethrough and is directed through said aperture and incident on the diffraction grating. Selected energy then is reflected back from said diffraction grating through the aperture through said lens element which focuses the selected energy onto the transparent rigid member outer surface.

Alternatively, a holographic diffractive element (HDE) can be created with a unique geometry such that it reflects/transmits a focused spectrally pure real image a short distance in front of it onto a diffuse surface. This unique geometry for the construction of the hologram provides a "self focusing" pixel. Thus, when a reference beam strikes the HDE in the conjugate direction (from the opposite side in a direction towards the original source), a real image of a slit (e.g., aperture of the opaque spacer) is reconstructed at a distance $d_1$ from the HDE. The HDE, which also contains a diffraction pattern and movement force (for example, a bimorph with diffraction pattern), is placed a distance $d_1$ from the transparent rigid member. When a reconstruction beam strikes the HDE, the angle of incidence will result in a color image of the slit being projected as a diffuse "dot" onto the rigid transparent member for viewing by an observer. As the HDE is bent, the incidence angle will vary and so will the color projected. A matrix of HDEs results in a display of discreet colored pixels.

While selected energy or wavelengths of energy can range anywhere from the infrared to the ultra-violet region of the spectrum, advantageously, the visible spectrum will be utilized wherein each patterned element, for example, piezoelectric element/aperture/lens element combination will be capable of providing "single pixel" full color. Moreover, each such element is separately addressable so that a matrix of such elements are able to generate graphic displays that can be static or dynamic. Advantageously, the diffraction grating can be holographic in nature as can the lens elements. A facile method of constructing the inventive display also is disclosed. Such technique involves the manufacture of display modules which can be inter-connected for making displays of varying size.

Another embodiment utilizes magnetic moment actuator to provide out of plane deflection. Still another embodiment uses the forces on a current carrying conductor which is immersed in an orthogonal magnetic field to provide out of plane deflection.

Advantages of the present invention include a diffractive display that has no moving parts, but for the elements which merely are physically displaced between a relaxed state and an excited state(s). Another advantage is a diffractive display that is relatively simple in construction, yet provides remarkably brilliant reflected colors. Yet another advantage is a diffractive display which effectively provides single pixel full color for visual graphic displays. Yet another advantage is a diffractive display that can be manufactured modular for varying the size of the display. Yet a further advantage is the ability to individually address each element in a matrix of such elements for providing dynamic and animated graphic displays. Yet another advantage is the ability to generate displays in a reflective or a transmissive mode of operation. A still further advantage is that the display has a wide view angle. These and other advantages will be readily apparent to those skilled in the art based upon the disclosure contained herein.

BRIEF DESCRIPTION OF THE DRAWINGS

For a fuller understanding of the precepts and advantages of the present invention, reference is made to the description that follows taken in conjunction with the accompanying drawings in which:

FIG. 6 is a schematic representation of a diffractive optical element (DOE) operating in either a daytime or a nighttime mode;

FIG. 7 is a partial cross-section of the novel display in a reflective mode of operation;

FIG. 8 is an overhead plan view of the novel reflective display;

FIG. 9 is a side elevational view of one of the bimorph elements of the novel display for either reflective or transmission mode of operation;

FIG. 10 is a partial overhead plan view of a layer of bimorph elements for either reflective or transmission mode of operation;

FIG. 13 is a schematic representation of the construction of an HDE;

FIG. 14 is a side elevational view of the HDE of FIG. 13 being used to display colors;

FIG. 15 is a side elevational view of a pair of HDEs being projected thought apertures for viewing discreet color pixels;

FIG. 16 is a side elevational view of an embossed element whose end is moved by plunger 134 which may be electrostrictive or magnetostrictive;

The drawings will be described in detail below.

DETAILED DESCRIPTION OF THE INVENTION

Much of the following description is of a piezoelectric or bimorph element used in the diffraction of energy by its movement; however, such description is illustrative of the invention and not a limitation of the invention as electrostrictive, electromotive, electrostatic, and magnetostrictive elements similarly can carry the diffraction grating and be moved to diffract incident energy for generating a display.

With respect to the reflective mode of operation of the novel diffractive display, embossing a diffraction grating or rainbow holographic diffraction grating onto a reflective piezoelectric material diffracts a particular color when illuminated by a broad band source at a particular angle. Application of a voltage to the piezoelectric material will cause the material to move and, thus, change the angle of the incident light to the diffraction grating. This will cause the beam diffracted at a given angle to change its wavelength. For a broad band visible light source (although the present invention is equally applicable to ultra-violet and infrared wavelengths of energy), it is possible to cause a pixel to reflect the colors red, green, and blue, as a function of the applied voltage to the embossed piezoelectric material. For present purposes, a pixel is defined as bimorph material on which is embossed a holographic diffraction grating.

In order to achieve color uniformity and a wide field of view, this grating should be a hologram of, e.g., ground glass, photographic film, or the like. The diffracted color is determined by the grating equation:

$$\lambda = d(\sin i + \sin \delta)$$

where, $\lambda$=wavelength of diffracted light (microns)

d=grating spacing of one cycle (microns)

i=angle of incidence from plate normal (degrees)

$\delta$=angle of diffraction from plate normal (degrees)

Figure 1:
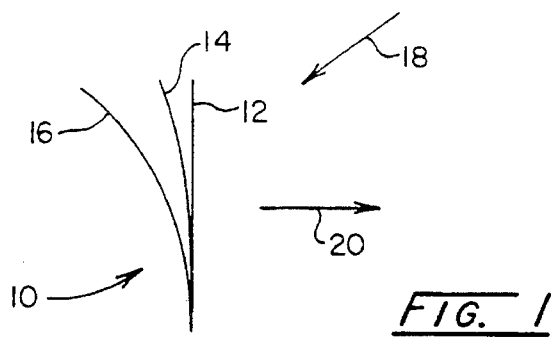
FIG. 1 is a side view of a bimorph element shown in three different positions for generating three different colors.

For a fixed $\delta$ and a fixed d, the wavelength will vary with changes in i. FIG. 1 diagrammatically displays three positions of a grating on bimorph 10 reconstructing red, green, and blue for position 12, position 14, and position 16, when incident light 18 impacts bimorph 10 with its diffraction grating resulting in diffracted light 20 being reflected therefrom. In order to achieve diffracted light 20, the surface of bimorph 10 upon which reference light beam 18 strikes must be both reflective and contain a diffraction grating. By varying the position of bimorph 10, the diffracted energy (e.g. color) reflected can be controlled.

Figure 2A:
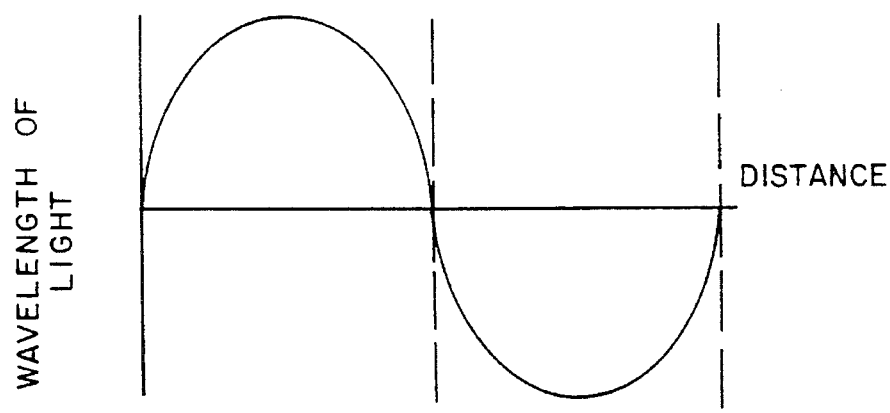
FIGS. 2a–c illustrate how a physical structure of a fixed index of refraction can create an apparent variation in the index of refraction.
Figure 2B:
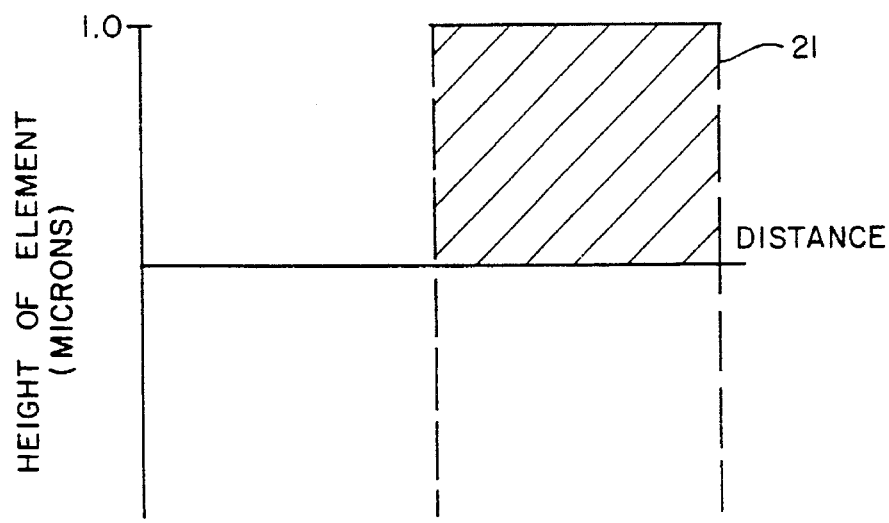
Figure 2C:
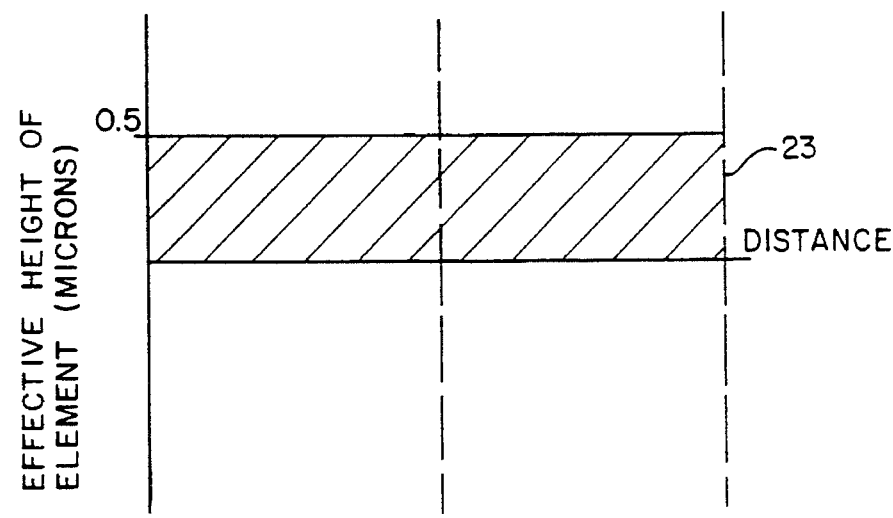

With respect to the transmission mode of operation of the novel diffractive display, some piezoelectric films, such as polyvinylidene fluoride (PVDF or $PVF_2$) are optically transparent. A holographic or other diffraction pattern, then, can be embossed into the material directly, for example. The transmitted light diffracts due to the apparent changes in the index of refraction across the material due to grating thickness (spacing as a function of bimorph bend or stretch) variations. This apparent index of refraction change is illustrated in FIG. 2. If the size variations of the grating structure are smaller than a wavelength of light, the average index of refraction will be taken across the material over the length of the light wavelength as illustrated at FIG. 2c. Thus, an effective modulating index of refraction ($\eta$=1.2 as at item 23) occurs across the surface of a material which has a fixed index of refraction ($\eta$=1.4 as at item 21). The larger the fixed index of refraction of the material, the greater the effective modulation depth can be. For this reason, it may be desirable to place a thin layer of a very high index of refraction transparent material over top of the PVDF film and then emboss into this layer to increase the depth of modulation and, thus, the diffraction efficiency. This grating may be formed into the film by embossing or holographically using a photographic emulsion.

This modulation mechanism in a holographically produced transmission grating is that the diffraction pattern produced holographically produces dark and light areas in proportion to the intensity of the incident electric field. These dark and light areas are converted to variations in the index of refraction of the material proportional to the applied electric field by a process called "bleaching" which is commonly used to dramatically increase the diffraction efficiency and produce what is referred to as a "phase grating".

An electric field still must be applied across an electrically-conductive bimorph element in order to get movement. This conductivity is achieved by applying a layer of a thin transparent conductive film to each side of the bimorph ($TiO_2$ or indium tin oxide being examples of such materials that are readily available).

When a fixed broad band light source illuminates this grating, a particular color of light is diffracted at a particular angle according to the grating equation described above.

Figure 3B:
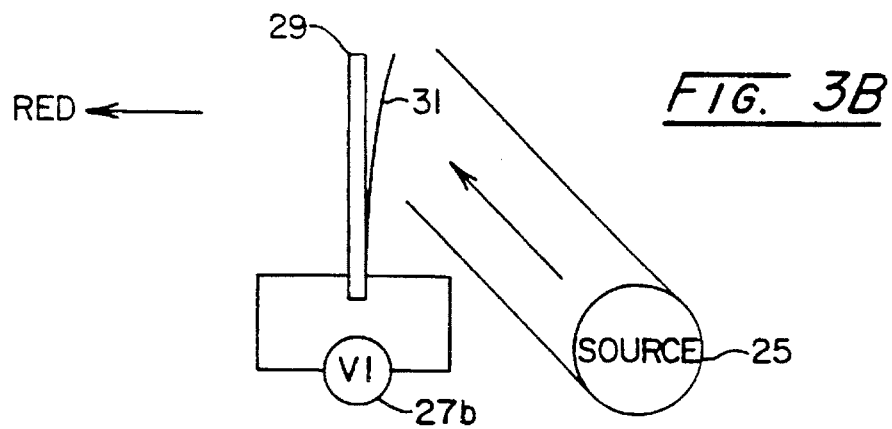
FIGS. 3a–d are schematic representations of the operation of a diffractive bimorph element operation in the transmission mode.
Figure 3A:
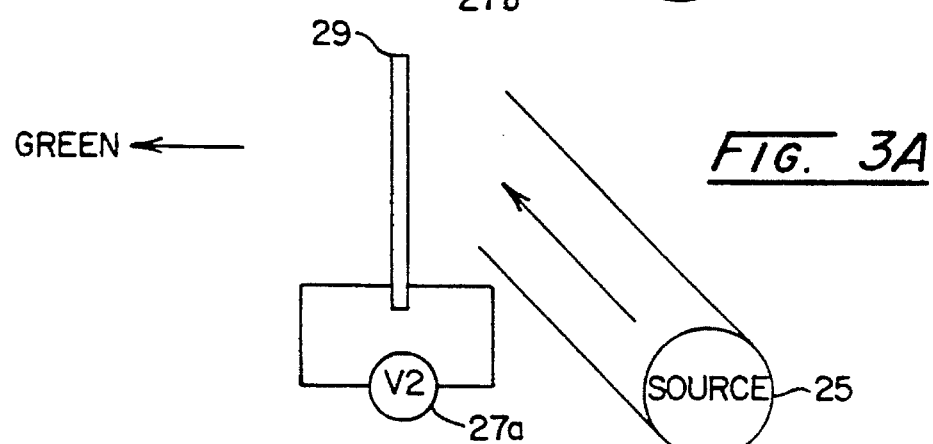
Figure 3C:
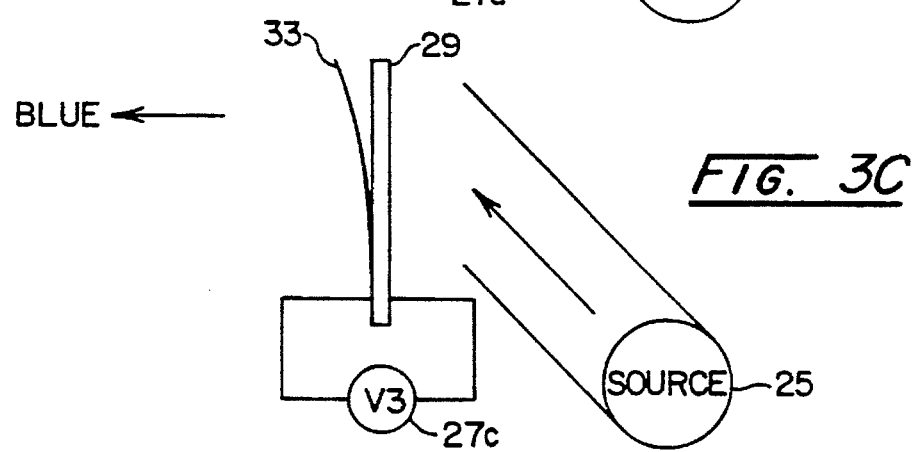
Figure 3D:
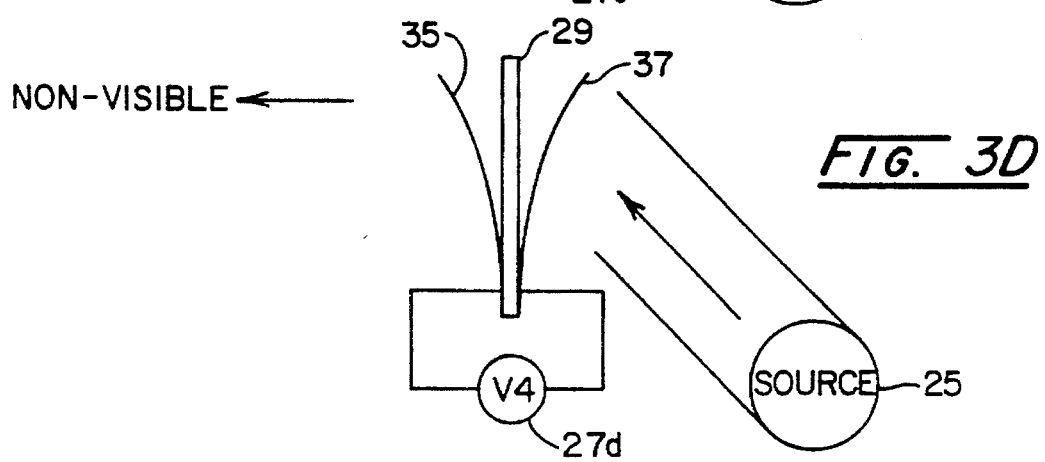
Figure 4B:
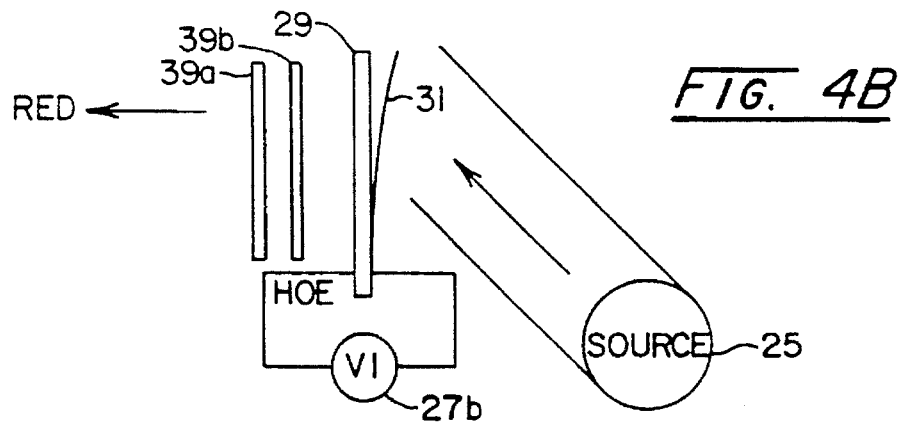
FIGS. 4a–d are schematic representations of the operation of a diffractive pixel operation in the transmission mode.
Figure 4A:
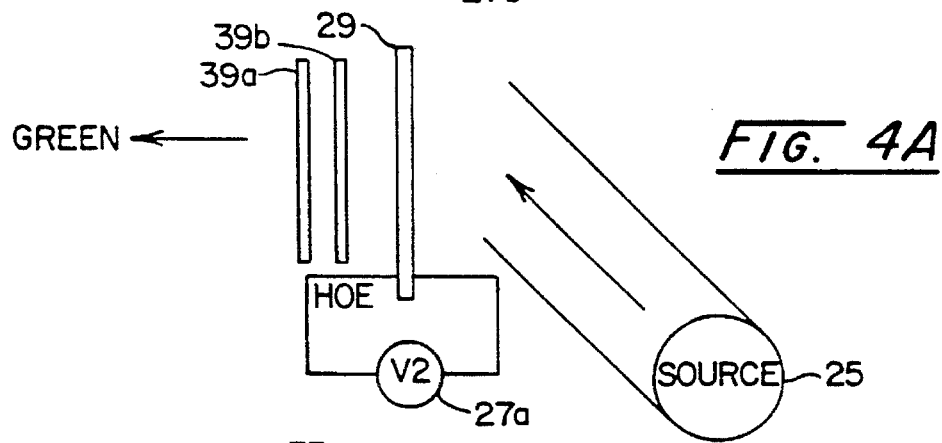
Figure 4C:
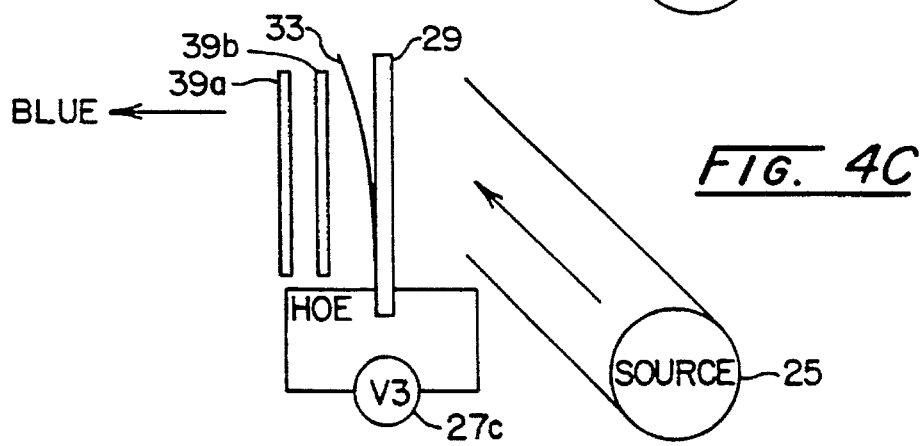
Figure 4D:
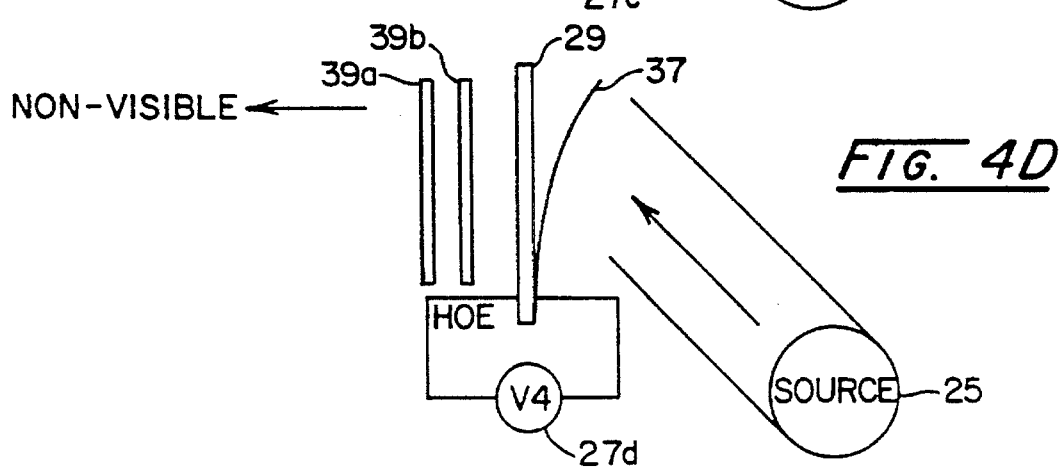

Application of a voltage across the bimorph will cause the bimorph to bend and change the angles i and δ. Since d is fixed, the wavelength changes in proportion to the angle. The resulting effect is that the illuminated bimorph appears to be a color from the illuminating spectrum in proportion to the applied voltage as illustrated at FIGS. 3 and 4. In FIGS. 3a–d, source 25 illuminates bimorph 29 which is connected to electrical source 27a–d, respectively. In FIG. 3a when no bias voltage is applied to bimorph 29, bimorph 29 diffracts energy from source 25, which is a suitable broadband light source, to transmit green light therethrough. In FIG. 3b when source 27b generates a given voltage, bimorph 29 bends to position 31 such that the source energy is transmissively diffracted to produce red light. In 3c when source 27c generates a different given voltage, bimorph 29 bends to position 33 such that the source energy is transmissively diffracted to produce blue light. In FIG. 3d when source 27d generates yet another voltage, bimorph 29 bends to position 35 or position 37 such that the source energy is transmissively diffracted outside the visible spectrum to effectively block all light transmission. In FIGS. 4a–d, the same diffraction transmission bimorph arrangement as that described in FIGS. 3a–d is illustrated, except that directionally diffusive surface 39a and holographic optical element (holographic lens) 39b are placed on the output side of bimorph 29 to increase the effective brightness of and, thus, the diffracted energy from bimorph 29.

Referring now to the bimorph elements or bimorphs in more detail, a single layer of PVDF or other piezoelectric film deforms by a small amount when subjected to an electric field. This deformation can be amplified to a very high magnitude using a bimorph configuration which consists of two piezoelectric films laminated together typically with an adhesive. When an excitation voltage is applied, one layer expands while the other layer contracts, resulting in the bimorph bending as an individual structure. The motion amplitude ratio of a bimorph approximates the ratio of its length to its thickness. Hence, a magnification of several thousand times can be obtained easily using, for example, a 5 μm thick PVDF bimorph. Thus, a simple bimorph configuration generates a large bending motion with low frictional losses.

Experimentally and analytically, it is found that lateral deflection is linearly related to the applied electric field and load. The equations governing the displacement, force generated, and voltage output of a bimorph are:

$$\Delta x = \frac{3 V d_{31} L^2}{4 t^2} \text{ (series connection)}$$

$$\Delta x = \frac{3 V d_{31} L^2}{2 t^2} \text{ (parallel connection)}$$

$$F = \frac{3 V d_{31} w t Y}{2 L}$$

$$V = \frac{3 g_{31} Y t^2 \Delta x}{4 L^2}$$

where,

V=applied voltage (volts)

F=generated force (newtons)

Δx=displacement (meters)

L, t, w=length, thickness, and width of film, respectively (meters)

Y=Young's modulus of the film ($2 \times 10^9$ N/m² for PVDF)

$d_{31}$, $g_{31}$=piezoelectric strain and stress constants, respectively.

Figure 5A:
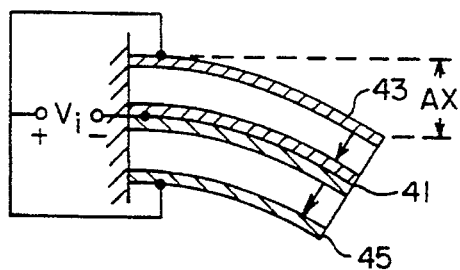
FIGS. 5a and b are schematic representations of a bimorph element connected in parallel or series to voltage source.
Figure 5B:
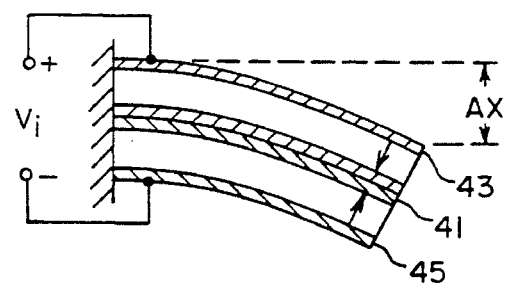

A bimorph is constructed using uniaxially-oriented PVDF or other film with surface uniformly metalized (for the reflective mode of operation) with conductive materials (e.g., aluminum ink) in two different lamination configurations: parallel and series. FIGS. 5a and 5b show the parallel and series laminations, respectively, with the basic difference being the mode of lead attachment to voltage source $V_i$. Bimorph element 41 has electrically-conductive layers 43 and 45 laminated or affixed thereto. In the parallel laminate in FIG. 5a, both films of bimorph 41 stretch in the same direction resulting in a higher force but lower displacement Δx at the tip. In the series laminate in FIG. 5b, the films of bimorph 41 stretch in the opposite direction with respect to each other leading to a lower force generation but increased displacement Δx at the free end. Further information on bimorphs can be found in the following references which are expressly incorporated herein by reference: Toda, et at., "Large Area Display Element Using PFV₂ Bimorph With Double-Support Structure", *Ferroelectrics*, 1980, Vol. 23, pp 115–120; Toda, et al., "Large Area Electronically Controllable Light Shutter Array Using PFV₂ Bimorph Vanes", ibid at pp. 121–124; Linvill, "PFV₂ Models, Measurements and Devices", id at Vol. 28, pp. 291–296; Negran, et al., "A Clue to the Origin of Pyroelectricity in PFV₂ From the Low Temperature Behavior", ibid at p. 299; Willis, et at., "The Structure of Electric-Field-Induced Layer Defects in Surface-Stabilized Ferroelectric Liquid Crystal Display Cells", *SID* 90 *Digest*, pp 114–116; Kistner, et al., "Evaluation of a Small Wearable Display", ibid at pp 136–139; and Reinke, "High Density Display/Driver Interconnections Using Anisotropic CAIS: (Conductive Adhesive Interconnect System)", SPIE Vol. 1080, *Liquid Crystal Chemistry, Physics, and Applications* (1980).

A hologram or diffraction grating is embossed into, for example, a metal layer adhering to one side (for example, a common ground in a matrix or an array of bimorphs) which can be reflective (e.g., highly reflective aluminum) or can be transparent (e.g., $TiO_2$, indium tin oxide, or the like) for a reflective or transmission mode, respectively. Alternatively, the hologram or diffraction grating can be embossed into a transparent film (e.g., Mylar® brand polyester) which is laminated, typically with a transparent adhesive, to the bimorph.

Holographic lenses are a particular type of holographic optical element (HOE) or diffractive optical element (DOE) which have the characteristic that they operate by modifying light waves by the properties of diffraction rather than refraction which is used by conventional optics. In other words, a wavefront can be made to diverge or expand by diffracting the wavefront with a microscopic spatially varying pattern of dark and light areas or by spatially varying refractive indices, as opposed to conventional optics where light rays are bent strictly from continuously varying macroscopic variation in the index of refraction.

Diffractive optics have the advantage that they are lighter, smaller, and can be less expensive to manufacture, and can be made to modify wavefronts in ways that would be impossible with conventional optics. However, they have the disadvantage for imaging applications that they have more severe chromatic aberrations than conventional optics. Since imaging is not required of the novel diffractive display, this disadvantage is of no moment.

The DOE described herein would collect collimated light from a specific angle or selected group of angles and focus that energy to a focal point. When coupled with a bimorph element (bimorph 50 in FIG. 7, described in detail below) as also described herein, the DOE focal point is on surface 24

(FIG. 7) of outer rigid transparent member 22 (FIG. 7). Schematically, the DOE is illustrated at FIG. 6 where daytime reference beam 47 strikes HOE/DOE 49 which focus the resulting transmitted energy at focal point 51 and where nighttime reference beam 53 strikes HOE/DOE 49 which focus the resulting transmitted energy also at focal point 51. Further information can be found in the following references which are expressly incorporated herein by reference: Hayford, "Holographic Optical Elements", *Photonics Spectra*, pp 77–79 (April 1982); and Fan, et al, "Color Coding Reproduction of Two-Dimensional Objects with Rainbow Holography", *Optical Engineering*, October 1991, Vol. 30, No. 10, 1625–1628.

With respect to a display that can be readily manufactured for implementing the reflective diffractive technique described in connection with FIGS. 7–12, reference initially is made to FIG. 7. At this point, much of the remaining description of the present invention will be with respect to use of incident sunlight (or an equivalent thereof) wherein the novel graphic display in a reflective mode of operation exhibits single pixel full color generation. It will be understood, however, that such description is by way of illustration and not limitation since non-visible wavelengths of energy in the ultra-violet and infrared areas of the spectrum can be efficiently and effectively used by the novel display described herein, as can a transmission mode of operation. With respect to FIG. 7 in particular, outer transparent rigid member 22 most suitably will be glass, though transparent plastics or ceramics could be used if desired. Rigidity of transparent member 22 aids in making the entire display rigid. Outer surface 24 upon which incident light 26 strikes has been coated with a non-linear coating. Such non-linear coating allows light 26 to pass through transparent rigid member 22 but will not permit reflected light striking inner surface 28 coming back through member 22 will be attenuated on top surface 24. It is on top surface 24 that the pixel information is generated, as represented at pixel 30. Non-linear coatings, such as magnesium fluoride ($MgF_2$) and others, are well known in the art.

Adjacent inner surface 28 of glass 22 is a matrix of discrete lens elements represented as lens elements 32–38. It should be understood that while only four lens elements are shown and only lens element 32 will be described in detail, such lens elements are representative of a matrix of discrete lens elements of suitable size and packing density as is required for the particular display being manufactured. Advantageously, lens elements 32–38 can be made as holographic lenses in layer 40. Each lens element needs to be complex because it is collecting incident light and focusing it on a bimorph element, and then focusing the reflected selected light back onto outer surface 24 of rigid member 22 for forming pixel 30. A description of the generation of such holographic lens can be found in, for example: *The SPIE Holographics International Directory & Resource Guide*, The Society of Photo-Optical Instrumentation Engineers, Bellingham, Wash. (1993). Non-holographic lens elements commercially available include SMILE™ spherical micro-integrated lenses supplied by Corning Incorporated (Corning, N.Y.), and Monolithic Lenslet Modules supplied by Adaptive Optics Associates, Inc. (Cambridge, Mass.). The disclosures of these references are expressly incorporated herein by reference.

While glass member 22 and lens element assembly 40 can be held together under compression at their edges, it is desirable that no dead air space remain between these layers. Thus, in order to fill any dead air spaces and in order to keep these layers in their proper relationship to each other, preferably a layer of adhesive (not shown in the drawings) is interposed between member 22 and layer 40. Suitable adhesives must be transparent to the wavelengths of energy being accepted and reflected by the display. Conveniently, an ultra-violet (UV) radiation curable adhesive is utilized as these adhesives can be made readily transparent, can be rapidly cured at room temperature, and are readily commercially available.

Representative ingredients forming the adhesive include, for example, reactive vinyl monomers such as the lower alkyl esters of acrylic and methacrylic acids or polymers or prepolymers thereof. Vinyl monomers particularly adapted for photopolymerization include, for example, methyl methacrylate, ethyl methacrylate, 2-ethyl hexyl methacrylate, butyl acrylate, isobutyl methacrylate; the corresponding hydroxy acrylates, e.g., hydroxy ethyl acrylate, hydroxy propyl acrylate, hydroxy ethyl hexyl acrylate; also the glycol acrylates, e.g. ethylene glycol dimethacrylate, hexamethylene glycol dimethacrylate; the allyl acrylates, e.g. allyl methacrylate, diallyl methacrylate; the epoxy acrylates, e.g. glycidyl methacrylate; and the aminoplast acrylates, e.g. melamine acrylate. Other ingredients include diallylphthalate, vinyl acetate, vinyl and vinylidene halides, N-vinyl pyrroleidone, and amides, e.g. methyl acrylamide, acrylamide, diacetone acrylamide, butadiene, styrene, vinyl toluene, and the like, and mixtures thereof. Specific preferred UV curable ingredients include acrylic acid, hydroxyethylacrylate, 2-ethylhexylacrylate, trimethylolpropane triacrylate, glycerylpropoxytriacrylate, polyethylene glycol diacrylate, polyethylene oxides, and polyvinyl acetate. A wide variety of additional compounds may be used in forming the adhesive as those skilled in the art will appreciate.

Ultraviolet photosensitizers or sensitizers are combined with the monomers or prepolymers used to form the adhesive for achieving cure in the presence of UV radiation. Useful UV sensitizers or photosensitizers include halogenated polynuclear ketones such as disclosed in U.S. Pat. No. 3,827,957; and organic carbonyl compounds selected from alkyl phenones, benzophenones, and tricyclic fused ring compounds as disclosed in U.S. Pat. No. 3,759,807. Further useful UV sensitizers include carbonylated phenol nuclear sulfonyl chlorides, such as set forth in U.S. Pat. No. 3,927,959. Typically, at least about 0.5% by weight of the UV sensitizer, and preferably about 1–5% sensitizer, is added to the ingredients and thoroughly mixed or otherwise dispersed in the liquid carrier ingredients. The disclosures of these references are expressly incorporated herein by reference.

With respect to the holographic lens elements, finally, it will be appreciated that such lens elements can be in any shape or configuration, though they preferably are square when viewed from overhead to maximize the fill factor.

The next item is rigid opaque spacer 42 which has outer surface 44 and inner surface 46. Spacer 42 has a matrix of apertures in registration with the matrix of discrete lens elements, e.g. lens elements 32–38, with upper surface 48 being in adjacency with layer 40. Again, spacer 42 is rigid as is member 22 for providing structural integrity to the display. Spacer 42 can be made of metal (e.g. aluminum), ceramic material, polymeric material, or any other material that can be rendered opaque to the wavelengths of energy impinging upon the display. While the apertures, e.g. aperture 48, can be a hole in spacer 42, the aperture additionally can be transparent material of the same or different composition as the remaining opaque areas of spacer 42. FIG. 8 shows an arrangement of apertures as would be seen when viewing the novel display. As stated above, the size, density, and arrangement of the apertures (and, hence, pixels) can be determined by the display manufacturer.

Next, a matrix of discrete bimorph elements in registration with the rigid opaque spacer apertures is provided. In FIG. 7, bimorph elements 50–58 are shown. In particular, bimorph element 50 is in registration with aperture 48 which, in turn, is in registration with lens element 32. Aperture 48 restricts light directed by lens 32 to strike bimorph element 50 and not strike any other bimorph element of the matrix of bimorph elements.

Bimorph element 50 can be seen in greater detail by reference to FIGS. 9 and 10. With respect to FIG. 9, bimorph element 50 is seen to be composed of piezo layers 60 and 62. The upper surface of piezo layer 60 is coated with a continuous layer of metal 64 which preferably is connected to ground 66 by lead 68 and on/in which diffraction pattern 65 is created. With respect to FIG. 10, layer 76, including the outer surfaces of bimorphs 50, 52, and 78, is entirely coated with metal or other electrically material. Piezo layer 62 has its outer surface coated with a discrete layer of metal 70 which can be hooked to a source of voltage 72 by lead 74. With respect to FIG. 10, bimorphs 50, 52, and 78 each have only their bottom surfaces metallized.

FIG. 10 also shows how the bimorph element array can be manufactured from continuous bimorph sheet 76 by die-cutting three orthogonal sides to form rectangular bimorphs 50, 52, and 78 which still are connected to sheet 76 by one side. This geometry permits each bimorph element to be displaced as the phantom position in FIG. 9 illustrates. It should be understood that the geometric configuration depicted in FIG. 10 is illustrative only. Other geometries easily can be envisioned.

Figure 11:
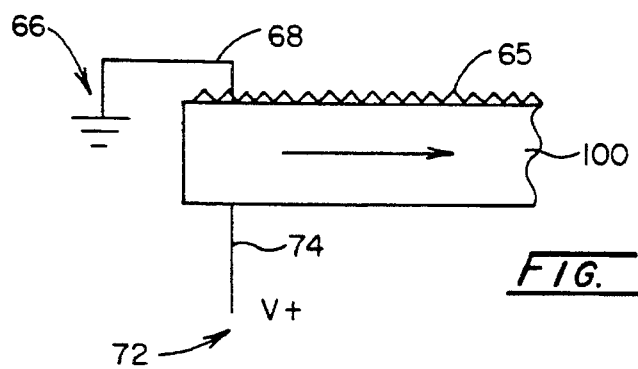
FIG. 11 is a side elevational view of a piezoelectric film element embodiment for either reflective or transmission mode of operation.
Figure 12:
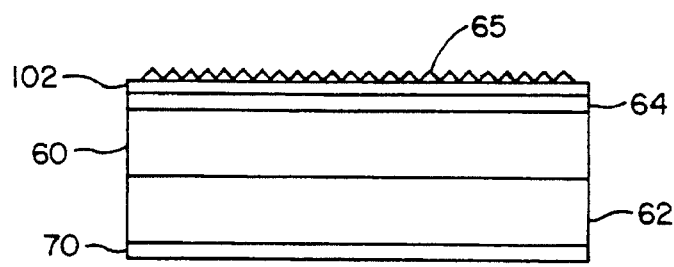
FIG. 12 is a side elevational view of yet another bimorph element embodiment for either reflective or transmission mode of operation.

Additionally with respect to FIG. 11, it will be observed that piezoelectric film element 100 is manufactured so that is can be lengthened or contracted in-plane by application of a voltage thereto so that the effective spacing of diffraction pattern 65 will be altered. For that matter, a transparent layer can be embossed, transparent layer 64, and diffraction grating 65 created in transparent layer 64, as illustrated at FIG. 12.

Underneath bimorph layer 76 (FIG. 10) and its discrete bimorph elements 50–58 can be placed printed wiring board (PWB) or circuit board 80 (FIG. 7) which can be connected to leads 74 and 84–88 extending from the discrete metallization layers, e.g. metallization layer 70, connected therewith. PWB 80, which suitably can be a multi-layer printed wiring board, enables each discrete bimorph element via each respective lead to be addressed individually.

Metallization of the discrete bimorph elements or of layer 76 (FIG. 10) can be applied by vapor deposition metallization techniques, liquid coating techniques, and like techniques. It should be understood that such metalized bimorph films are commercially available such as KYNAR® piezo film (polyvinylidene fluoride film, AMP Industries, Inc., Valley Forge, Pa.).

With specific reference to FIGS. 7, 9, and 11, it will be observed that light 26 (FIG. 7) incident on glass 22 passes thought lens element 32 which directs the light through aperture 48 and onto bimorph element 50. A application of a positive voltage to bimorph element 50 results in element 50 being deflected upwardly as shown by arrow 90 to the position shown in phantom. Alternatively, bimorph element 100 (FIG. 11) could be elongated by application of the voltage. A selected band of light (e.g., red) then would be reflected back by the metal layer 64 through aperture 48 and into lens element 32. Lens element 32 then would focus the red light onto upper surface 24 of glass 22 whose coating would attenuate the red light on surface 24 to generate red pixel 30. It will be appreciated that deflection of bimorph element 50 downwardly by application of a negative voltage would result in blue light being generated while green light would be generated when bimorph element is its relaxed state. The selection of voltages and colors in the above description is for illustration purposes. Also, it will be appreciated that bimorph element 50 also can be moved into a position whereby no light is reflected so that bimorph element 50 would act as its own shutter. By addressing each bimorph element separately, pixels of varying color can be generated for static or dynamic graphic displays.

By simply making metallization layers 64 and 70 transparent, the assembly in FIG. 9 or 12 can operate in a transmission mode wherein light striking transparent metallization layer 70 at an angle then passes though bimorph 50 and is diffracted by diffraction pattern 65 to generate a given color, as described above.

An alternative embodiment to the construction set forth at FIGS. 7–12 eliminates HOE/DOE 49 (FIG. 6) by incorporating its focusing function into a holographic diffractive element (HDE), as illustrated at FIGS. 13–15. The HDE is created with a unique geometry such that it reflects/transmits a focused spectrally pure real image a short distance in front of it onto a diffuse surface. FIG. 13 illustrates this unique geometry for the construction of the hologram that provides a "self focusing" pixel. Collimated, or slightly convergent, reference beam 104 impinges on photographic plate 106 at angle θ from plate 106 normal (shown in phantom). Object beam 108 is focused by lens 110 onto ground glass element 112 behind which is plate 114 which contains slit 116 through which object beam 108 passes. Object beam 108 passing through slit 116 and diverges out over a single pixel and interferes with reference beam 104 to make a hologram that is recorded on film 106. The purpose of slit 116 is to cause the reconstruction beam to spectrally separate. The purpose of spherical lens 110 is to cause each spectral color to focus to a point. Distance $d_1$ between film 106 and plate 114 need only be a few centimeters or less and slit 116 need only be about 2–5 centimeters wide.

Thus, when a reference beam strikes developed film 106 in the conjugate direction (from the opposite side in a direction towards the original source), a real image of the slit is reconstructed at a distance $d_1$ from film 106. FIG. 14 illustrates how the reconstruction of the three primary colors can be accomplished by movement of film 116 in the manner of element 50 (see FIG. 9) in the transmissive mode of operation (see FIGS. 3a–d). Plate 114, which also contains a diffraction pattern and movement force (for example, a bimorph with diffraction pattern as illustrated at FIG. 9), is placed a distance $d_1$ from glass plate 118. When reconstruction beam 120 strikes plate 114, the angle of incidence will result in a color image of slit 116 being projected as a diffuse "dot" onto glass plate 118 for viewing by observer 122. As plate 114 is bent, the incidence angle will vary and so will the color projected. At FIG. 15, opaque apertured plate 124 is placed a distance $d_1$ from plates 124 and 126 for observer 122 to view a matrix of discreet colored pixels.

With respect to other types of elements useful in practice of the present invention, reference is made to FIG. 16 wherein element 130 carries diffraction grating 132. Plunger 134 tactilely abuts the free end of element 130 which is fixed about pivot 136. Plunger 134 can be made of an electrostrictive material, such as are commercially available from AVX Corporation (Myrtle Beach, S.C.), e.g., Code C060210A, C060315A, C060020A, R020305A, etc.. See also, Uchino, et at., "Review: Electrostrictive Effect in Perovskites and its Transducer Applications", *J. Matls. Sci.*, 16 (1981) 569–578. Alternatively, plunger 134 can be made of a magnetostrictive material, such as are commercially available from Edge Technologies, Inc. (Ames, Iowa), ETREMA Terfenol-D (an alloy of terbium, dysprosium, and iron). Additionally, electrostatic elements can be used for plunger 134. See Younse, "Mirrors on a Chip", *IEEE Spectrum*, Nov. 1993, pp. 27–31.

Figure 17:
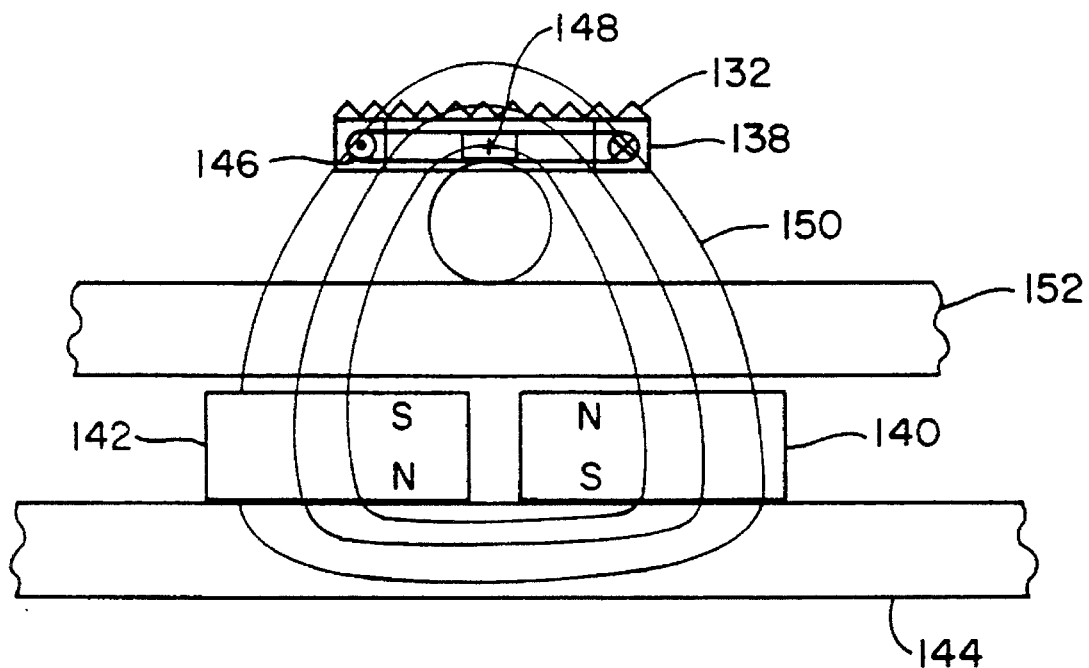
FIG. 17 is a side elevational view of an HDE assembly which operates on the principle of magnetic moment using permanent magnets whose poles are in a plane parallel to the plane of the relaxed diffraction grating.

Yet other embodiments for deflection of the diffraction grating are illustrated at FIGS. 17–20. Referring to FIG. 17, film 138 carries diffraction grating 132. Below film 138 are magnets 140 and 142 with oppositely disposed North-South as illustrated. These magnets sit upon back 144 which may or may not be magnetic (e.g., iron). Element 138 carries energizable coil 146 (or layers of coils, on the surface or embedded in the film) with axis perpendicular to the plane of the film which coils can be laid down, for example, by tape-automated bonding (TAB) and are connected to an energy source (e.g., electrical source), not shown. Element 138 has pivot axis 148 perpendicular into the side elevational view (into the paper) shown in FIG. 17. It is important to note that the pivot or hinge point for film 138 can be at either end, the center of gravity, or at any other location, and film 138 rotate as illustrated herein. When the coils are energized, a magnetic couple is created, as indicated by magnetic flux lines 150, and element 138 rotates about its pivot axis. If back 144 is magnetic, the field strength of permanent magnets 140 and 142 is improved, thus the torque (magnetic moment) on coil 146 is increased. More discussion of this technique can be found in U.S. Pat. No. 5,295,031. It should be pointed out that multi-layer printed wiring board (PCB) 152 may be interposed between element 138 and magnets 140, 142 in order to provide a base for the pivot axis of film 138 and to ease electrical connection of the coils in film element 138. The torque on coil 146 can be represented by the following equation:

$$\text{Torque on Coil} = \frac{\text{Ampere} \times \text{Turns}}{L} \times B \times \cos\theta \times \text{Constant}$$

where,
$\theta$=Angle between plane of coil winding and flux direction at the coil plane
Amperes=Current in coil (amps)
Turns=Number of turns in coil
L=Length of coil turns along coil axis (meters)
B=Flux density at coil turns (Tesla)

Figure 18:
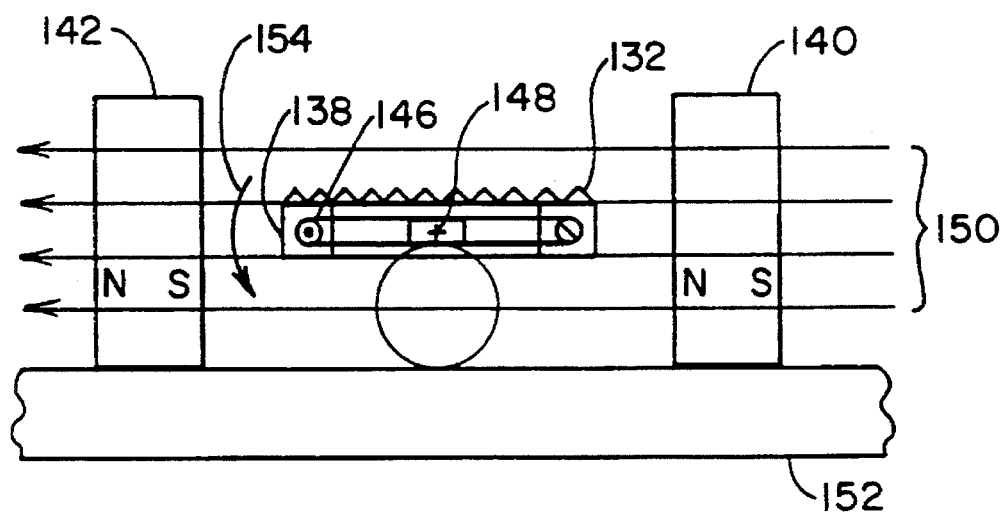
FIG. 18 is a side elevational view of an HDE assembly which operates on the principle of magnetic moment using permanent magnets whose poles are perpendicular to the plane of the relaxed diffraction grating.

Referring to FIG. 18, permanent magnets 140, 142 are disposed at the ends of film 138. Magnetic flux lines 150 are created as shown. The torque on coil 146 is shown by arrow 154 (with the current in the direction shown). PCB 152 is magnetic in this illustration. The torque on coil 146 can be represented by the following equation:

$$\text{Torque on Coil} = \frac{\text{Ampere} \times \text{Turns}}{L} \times B \times \cos\theta \times \text{Constant}$$

where,
$\cos\theta = 1$ = Angle between plane of coil winding and flux direction at the coil plane
Amperes=Current in coil (amps)
Turns=Number of turns in coil
L=Length of coil turns along coil axis (meters)
B=Flux density at coil turns (Tesla)

Figure 19:
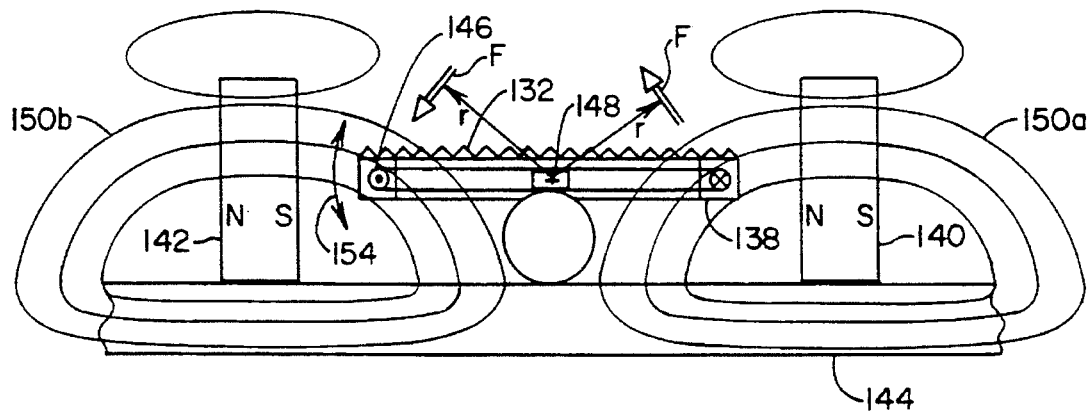
FIG. 19 is a side elevational view of an HDE assembly which operates on the magnetomotive principle F=B×L×i, using permanent magnets whose poles are perpendicular to the plane of the relaxed diffraction grating.

The embodiment depicted at FIG. 19 is like that at FIG. 18, except that steel back plate 144 replaces non-magnetic PCB 152. Such replacement yields flux lines 150*a* and 150*b*. Force, F, on coil 146 can be represented by the electromotive force formula:

$$F = B \times L \times i$$

where,
F=Force on coil
B=Flux density at coil turns (Tesla)
L=Length of coil turns along coil axis (meters)
i=Current in coil (amps)

Figure 20:
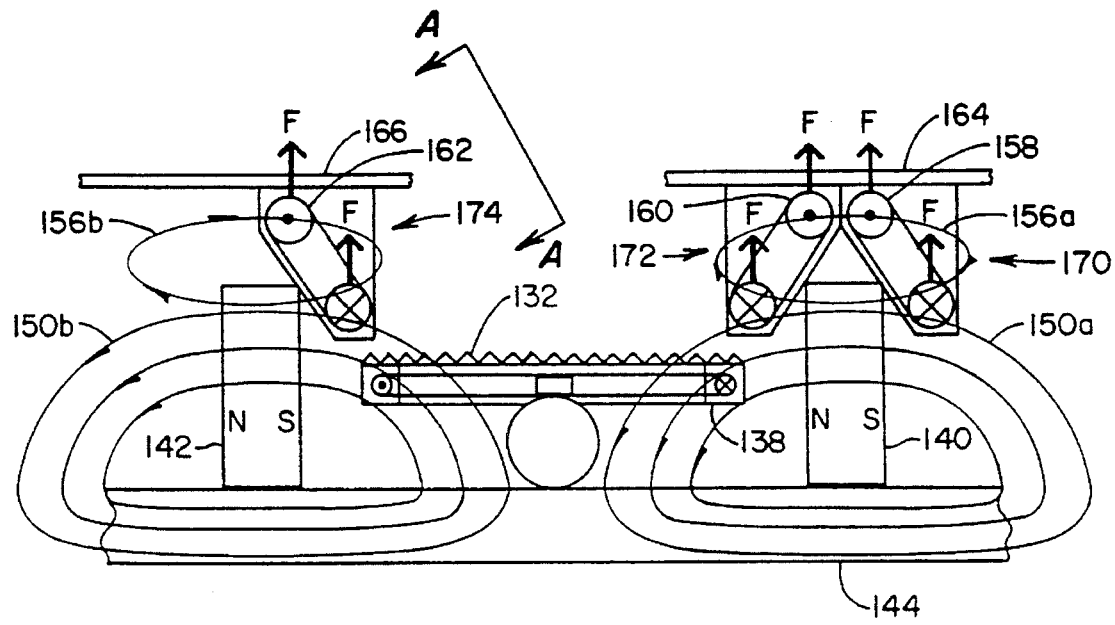
FIG. 20 is the HDE of FIG. 19 with sound generation capability added.
Figure 21:
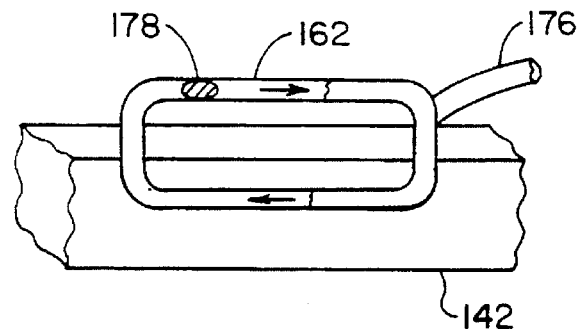
FIG. 21 is a sectional view taken along line 21 A—A of FIG. 20.

The torque on coil 146 does depend upon the hinge (pivot) point. The torque, $\tau$, for each applicable length of active winding can be represented by the following formula:

$$\tau = F \times r \times 2$$

where,
r is that winding's distance from the pivot (hinge) point
F=Force on coil FIG. 20 is the HDE of FIG. 19 with multi-channel stereophonic sound augmentation. Flux lines 156*a* and *b* can be seen in FIG. 20 to not participate in driving HDE 138. By inserting coils 158–162, it will be observed that the magnetic flux lines in the region of these coils are substantially orthogonal to the current direction in the coils. The resulting force, F, is, accordingly, orthogonal to both flux and current as depicted at FIG. 20. The force again can be represented by the equation, $F = B \times l \times i$, as described above. Thus, one or more sound drivers (coils) can be incorporated into each pixel to drive films 164 and 166, which can transparent films (even the same layer as the holographic lens), glass plate, or a separate film layer. These films contain the electrical conductors that lead from one sound driver to the next (electrically in series). Note, leakage flux 170–174 around coils 158–162, respectively. Such leakage flux interconnects each adjacent sound driver assembly as shown at FIG. 22 where 178 is from a previous coil and 176 is to the next coil.

Figure 22:
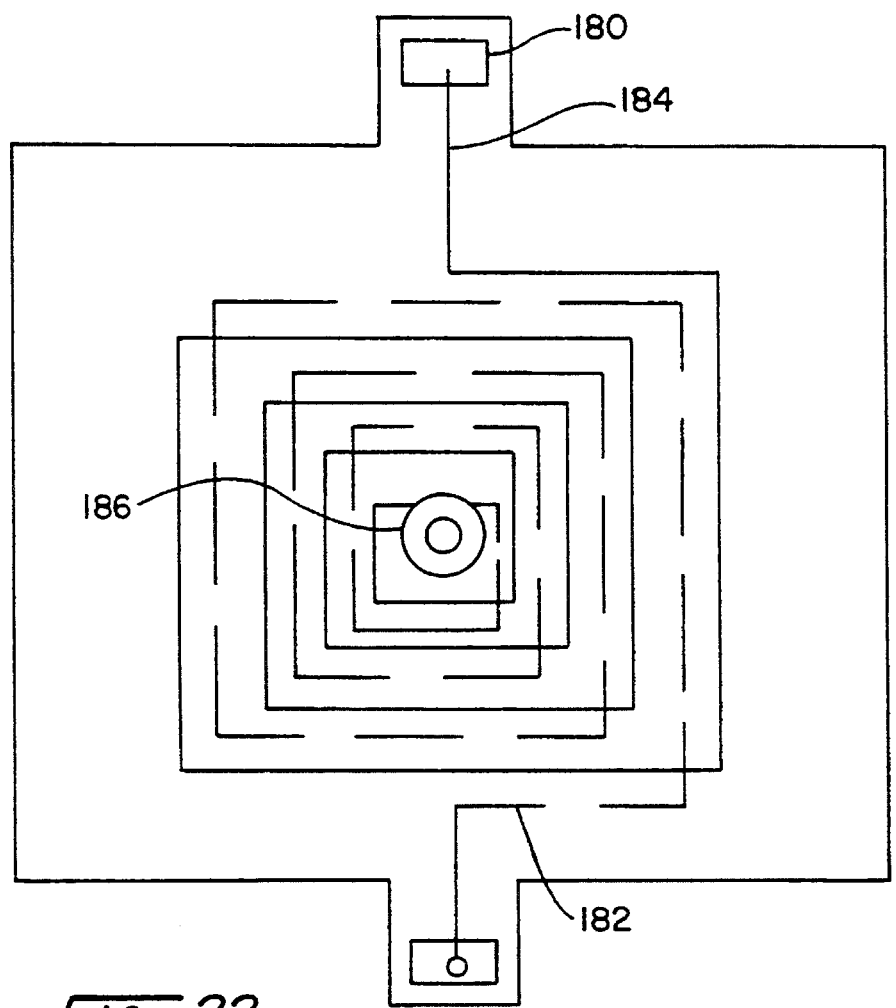
FIG. 22 is a plan view of the coils common to the HDE assemblies depicted at FIGS. 17–19.

Referring to FIG. 22, illustrates a coil plan view of a top and a bottom coil arrangement which can be used for the embodiments illustrated at FIGS. 17–20. Contact pad 180 is connected to PCB 152 at the bottom side of film 138 and is connected to another contact pad (not shown) on the upper side of film 138 by a through via. Conductive tracer 182 is on the top side of film 138 while conductive tracer 184 is on the bottom side of film 138 and terminates at contact pad 180. Both tracers terminate at through via 186 for making electrical connection from the top side to the bottom side of film 138. Of course, other embodiments of this magnetic coil technique will be readily realized by those skilled in this art. For example, while moving coils are illustrated, such coils may be held stationary and moving magnets may be incorporated into the HDE.

The disclosure herein is illustrative of the present invention which should be understood to include various variations, modifications, and equivalents to those disclosed herein as those skilled in the art will appreciate. In this application, all references are incorporated herein by reference.

We claim:

1. A display comprising an element which carries a holographic diffraction pattern which element is connected to a source energizable for movement of said element, wherein said holographic diffraction pattern is moved by movement of said element and wherein movement of said holographic diffraction pattern diffracts energy incident on said holographic diffraction pattern to generate different select diffracted energies from said holographic diffraction pattern.

2. The display of claim 1, wherein said element comprises a bimorph element.

3. The display of claim 2, wherein said diffraction pattern is embossed on said bimorph element.

4. The display of claim 3, wherein said embossed bimorph element reflects said diffracted energy.

5. The display of claim 3, wherein said embossed bimorph element is transmissive to said incident energy to generate said diffracted energy.

6. The display of claim 3, wherein said pattern is embossed directly on said bimorph element.

7. The display of claim 3, wherein said pattern is embossed on a film which is laminated to said bimorph element.

8. The display of claim 1, wherein said element is connected to an electrical or magnetic source for movement of said element.

9. The display of claim 2, wherein said bimorph element is connected in parallel to said electrical source.

10. The display of claim 2, wherein said element is connected in series to said electrical source.

11. The display of claim 3, wherein said element is connected to an electrical source for movement of said element.

12. The display of claim 11, wherein said bimorph element is connected in parallel to said electrical source.

13. The display of claim 11, wherein said bimorph element is connected in series to said electrical source.

14. A matrix of the display of claim 1.

15. A matrix of the display of claim 3.

16. The display of claim 3, wherein said bimorph is formed from layers of polyvinylidene fluoride (PVDF).

17. The display of claim 1, wherein said element has a pivot axis and a pair of ends each of which bear electrically energizable coils which are magnetically coupled with a pair of magnets which are spaced apart from said element ends, whereby energizing said coils causes said element to rotate about its pivot axis.

18. The display of claim 17, wherein said magnets are magnetically coupled through a magnetic back.

19. The display of claim 17, wherein said magnets are disposed beneath said element ends.

20. The display of claim 17, wherein said magnets are disposed adjacent to and at said element ends.

21. The display of claim 20, wherein a sound film is placed above at least one of said pair of magnets with another electrically energizable coil placed between said sound film and said magnet in an orientation whereby the electromotive force generated by current in said another coil is substantially orthogonal to said sound film, whereby energizing said another coil causes said sound film to vibrate to generate sound.

22. A transmissive diffractive display, which comprises:

(a) an outer transparent rigid member having an outer surface and an inner surface, said member restricting reflected energy incident on its inner surface;

(b) a discrete lens element having an apparent outer surface and an apparent inner surface and being adjacent said outer transparent rigid member, (c) a rigid opaque spacer having an outer surface and an inner surface, and having an aperture in registration with said discrete lens element and disposed in adjacency to the lens element apparent inner surface; and (d) a transmissive discrete element in registration with said rigid opaque spacer aperture, said discrete element having an inner surface and an outer energy diffractive surface adjacent said spacer aperture which diffractive surface bears a diffraction pattern for diffracting energy passed therethrough when said element is in a relaxed state, said discrete element connected to an electrical source effective to generate selected excited states therefor wherein said element is physically displaced from its location in a relaxed state, said element permitting a different diffraction of energy passed therethrough when said element is in an excited state;

whereby energy transmitted through the diffraction pattern is diffracted and then passes through said aperture through said lens element which focuses said diffracted energy onto the transparent rigid member.

23. The display of claim 22, wherein said diffraction pattern is embossed in said element.

24. The display of claim 22, wherein said diffraction pattern is embossed in a transmissive layer which is laminated to said element.

25. The display of claim 23, wherein said outer transparent rigid member outer surface is coated with a non-linear coating to restrict energy incident of the transparent rigid member inner surface.

26. The display of claim 22, wherein said discrete lens element is one or more of a holographic lens element or a diffractive lens element.

27. The display of claim 22, wherein said element is a bimorph element.

28. The display of claim 22, wherein said element has a pivot axis and a pair of ends each of which bear electrically energizable coils which are magnetically coupled with a pair of magnets which are spaced apart from said element ends, whereby energizing said coils causes said element to rotate about its pivot axis.

29. The display of claim 28, wherein said magnets are magnetically coupled through a magnetic back.

30. The display of claim 28, wherein said magnets are disposed beneath said element ends.

31. The display of claim 28, wherein said magnets are disposed adjacent to and at said element ends.

32. The display of claim 31, wherein a sound film is placed above at least one of said pair of magnets with another electrically energizable coil placed between said sound film and said magnet in an orientation whereby the electromotive force generated by current in said another coil is substantially orthogonal to said sound film, whereby energizing said another coil causes said sound film to vibrate to generate sound.

33. The display of claim 27, wherein said bimorph is formed from layers of polyvinylidene fluoride (PVDF).

34. The display of claim 22, wherein the function of items (b)–(d) comprises:

a film having said outer diffractive surface which is the function of item (d) and a focused developed holographic image of said aperture which is the function of items (b) and (c), the film being a distance from said member (a) effective for focusing said image on the inner surface of member (a).

35. A reflective diffractive display, which comprises:

(a) an outer transparent rigid member having an outer surface and an inner surface, said member passing incoming energy incident on its outer surface but restricting reflected energy incident on its inner surface;

(b) a discrete lens element having an apparent outer surface and an apparent inner surface and being adjacent said outer transparent rigid member, said lens element focusing energy passed through said outer transparent rigid member and incident thereon;

(c) a rigid opaque spacer having an outer surface and an inner surface, and having an aperture in registration with said discrete lens element and disposed in adjacency to the lens element apparent outer surface; and (d) an element in registration with said rigid opaque spacer aperture, which element has an outer energy reflecting surface adjacent said spacer aperture which reflecting surface bears a diffraction grating which permits reflectance of selected diffracted energy incident on said outer element surface when said element is in a relaxed state, said element connected to an electrical source effective to generate selected excited states therefor wherein said element is physically displaced from its location in a relaxed state, said element permitting reflectance of different diffracted energy incident on said element outer surface when said element is in an excited state;

whereby energy incident on the transparent rigid member outer surface passes therethrough and is focused through said aperture and incident on the diffraction grating, selected energy then is reflected back from said diffraction grating through said aperture through said lens element which focuses said selected energy onto the transparent rigid member outer surface.

36. The display of claim 35, wherein said diffraction pattern is embossed in said element.

37. The display of claim 35, wherein said diffraction pattern is embossed in a transmissive layer which is laminated to said element.

38. The display of claim 35, wherein said element is a bimorph element.

39. The display of claim 35, wherein said element has a pivot axis and a pair of ends each of which bear electrically energizable coils which are magnetically coupled with a pair of magnets which are spaced apart from said element ends, whereby energizing said coils causes said element to rotate about its pivot axis.

40. The display of claim 39, wherein said magnets are magnetically coupled through a magnetic back.

41. The display of claim 39, wherein said magnets are disposed beneath said element ends.

42. The display of claim 39, wherein said magnets are disposed adjacent to and at said element ends.

43. The display of claim 42, wherein a sound film is placed above at least one of said pair of magnets with another electrically energizable coil placed between said sound film and said magnet in an orientation whereby the electromotive force generated by current in said another coil is substantially orthogonal to said sound film, whereby energizing said another coil causes said sound film to vibrate to generate sound.

44. The display of claim 35, wherein said bimorph is connected in series to said electrical source.

45. The display of claim 35, wherein said bimorph is formed from layers of polyvinylidene fluoride (PVDF).

46. The display of claim 35, wherein the function of items (b)–(d) comprises:

a film having said outer diffractive surface which is the function of item (d) and a focused developed holographic image of said aperture which is the function of items (b) and (c), the film being a distance from said member (a) effective for focusing said image on the inner surface of member (a).

47. A method for generating different select diffracted energies from energy incident on a display, which comprises:

(a) providing an element which carries a diffraction pattern which element is connected to a source energizable for movement of said element, wherein said diffraction pattern is moved by movement of said element and wherein movement of said diffraction pattern diffracts energy incident on said diffraction pattern to generate diffracted energy from said diffraction pattern;

(b) directing energy onto said embossed diffraction pattern; and (c) controlling the movement of said element with said energizable source to vary the effective spacing of the diffraction pattern to control the select diffracted energy generated.

48. The method of claim 47, wherein said display comprises a diffraction pattern embossed on a bimorph element which bimorph element is connected to an electrical source for movement of said bimorph element.

49. The method of claim 48, wherein said directed energy comprises visible light and said bimorph element is controlled to generate select colors.

50. The method of claim 48, wherein said display is composed of a matrix of said bimorph elements for providing a matrix of select diffracted energy.

51. The method of claim 49, wherein said display is composed of a matrix of said bimorph elements for providing a matrix of select colors.

52. The method of claim 48, wherein said embossed element reflects said directed energy.

53. The method of claim 48, wherein said embossed element is transmissive to said directed energy.

54. The method of claim 47, wherein said element has a pivot point at its center of gravity and a pair of ends each of which bear electrically energizable coils which are magnetically coupled with a pair of magnets which are spaced apart from said element ends, whereby energizing said coils causes said element to rotate about its pivot point.

55. The display of claim 54, wherein said magnets are magnetically coupled through a magnetic back.

56. The display of claim 54, wherein said magnets are disposed beneath said element ends.

57. The display of claim 54, wherein said magnets are disposed adjacent to and at said element ends.

58. The display of claim 57, wherein a sound film is placed above at least one of said pair of magnets with another electrically energizable coil placed between said sound film and said magnet in an orientation whereby the electromotive force generated by current in said another coil is substantially orthogonal to said sound film, whereby energizing said another coil causes said sound film to vibrate to generate sound.

59. The method of claim 47, wherein said display provided comprises:

(a) an outer transparent rigid member having an outer surface and an inner surface, said member restricting reflected energy incident on its inner surface;

(b) a discrete lens element having an apparent outer surface and an apparent inner surface and being adjacent said outer transparent rigid member, (c) a rigid opaque spacer having an outer surface and an inner surface, and having an aperture in registration with said discrete lens element and disposed in adjacency to the lens element apparent inner surface; and (d) a transmissive discrete element in registration with said rigid opaque spacer aperture, said discrete element having an inner surface and an outer energy diffractive surface adjacent said spacer aperture which diffractive surface bears a diffraction pattern for diffracting energy passed therethrough when said element is in a relaxed state, said discrete element connected to an electrical source effective to generate selected excited states therefor wherein said element is physically displaced from its location in a relaxed state, said element permitting a different diffraction of energy passed therethrough when said element is in an excited state;

whereby energy transmitted through the diffraction pattern is diffracted and then passes through said aperture through said lens element which focuses said diffracted energy onto the transparent rigid member.

60. The display of claim 59, wherein the function of items (b)–(d) comprises:

a film having said outer diffractive surface which is the function of item (d) and a focused developed holographic image of said aperture which is the function of items (b) and (c), the film being a distance from said member (a) effective for focusing said image on the inner surface of member (a).

61. The method of claim 47, wherein said display provided comprises:

(a) an outer transparent rigid member having an outer surface and an inner surface, said member passing incoming energy incident on its outer surface and restricting reflected energy incident on its inner surface;

(b) a discrete lens element having an apparent outer surface and an apparent inner surface and being adjacent said outer transparent rigid member, said lens element reflecting energy passed through said outer transparent rigid member and incident thereon from the lens element apparent outer surface onto the outer transparent rigid member with such energy then being reflected back through said lens element;

(c) a rigid opaque spacer having an outer surface and an inner surface, and having an energy aperture in registration with said discrete lens element and disposed in adjacency to the lens element apparent inner surface; and (d) an element in registration with said rigid opaque spacer aperture, which element has an outer energy reflecting surface adjacent said spacer aperture which reflecting surface bears a diffraction grating which permits reflectance of selected diffracted energy incident on said outer element surface when said element is in a relaxed state, said element connected to an electrical source effective to generate selected excited states therefor wherein said element is physically displaced from its location in a relaxed state, said element permitting reflectance of different diffracted energy incident on said element outer surface when said element is in an excited state;

whereby energy incident on the transparent rigid member outer surface passes therethrough and is directed through said aperture and incident on the diffraction grating, selected energy then is reflected back from said diffraction grating through said aperture through said lens element which focuses said selected energy onto the transparent rigid member outer surface.

62. The display of claim 61, wherein the function of items (b)–(d) comprises:

a film having said outer diffractive surface which is the function of item (d) and a focused developed holographic image of said aperture which is the function of items .(b) and (c), the film being a distance from said member (a) effective for focusing said image on the inner surface of member (a).

63. A display comprising a piezoelectric film which carries a holographic diffraction pattern which piezoelectric film is connected to an electrical source for movement of said piezoelectric film, wherein said holographic diffraction pattern is moved by movement of said piezoelectric film and wherein movement of said holographic diffraction pattern diffracts energy incident on said holographic diffraction pattern to generate different select diffracted energies from the holographic diffraction pattern.

64. The display of claim 63, wherein said embossed piezoelectric film reflects said diffracted energy.

65. The display of claim 63, wherein said embossed piezoelectric film is transmissive to said incident energy to generate said diffracted energy.

66. The display of claim 63, wherein said piezoelectric film is connected in parallel to said electrical source.

67. The display of claim 63, wherein said piezoelectric film is connected in series to said electrical source.

68. A matrix of the embossed piezoelectric films of claim 63.

69. The display of claim 63, wherein said piezoelectric film is polyvinylidene fluoride (PVDF).

70. A display comprising a diffraction pattern embossed on an element wherein said element has a pivot point at its center of gravity and a pair of ends each of which bear electrically energizable coils which are magnetically coupled with a pair of magnets which are spaced apart from said element ends, whereby energizing said coils causes said element to rotate about its pivot point to diffract energy incident thereon to generate diffracted energy from the element.

71. The display of claim 70, said magnets are magnetically coupled through a magnetic back.

72. The display of claim 70, wherein said magnets are magnetically coupled through a magnetic back.

73. The display of claim 70, wherein said magnets are disposed beneath said element ends.

74. The display of claim 70, wherein said magnets are disposed adjacent to and at said element ends.

75. The display of claim 74, wherein a sound film is placed above at least one of said pair of magnets with another electrically energizable coil placed between said sound film and said magnet in an orientation whereby the electromotive force generated by current in said another coil is substantially orthogonal to said sound film, whereby energizing said another coil causes said sound film to vibrate to generate sound.

* * * * *